Patented Nov. 15, 1949

2,488,479

UNITED STATES PATENT OFFICE 2,488,479

SEPARATION OF PHENOLS FROM THIOPHENOLS

Hans Schindler, Petrolia, Pa., assignor to The Pure Oil Company, Chicago, Ill., a corporation of Ohio No Drawing. Application September 24, 1948, Serial No. 51,123

19 Claims. (Cl. 260—609)

This invention relates to a method of separating phenols from thiophenols and, in particular, it relates to an adsorption process of separating phenols from thiophenols which have closely related structures.

This application is a continuation-in-part of my application Serial Number 547,989, now abandoned, filed August 3, 1944.

Phenols recovered from coal tars and petroleum oils are frequently admixed with thiophenols which occur naturally in the same media and because of the chemical similarity of the two types of compounds, separation is very difficult when purely chemical means are used. This in particular is true when phenols are extracted from their natural media by means of caustic alkali solution. A common source of mixtures of phenols and thiophenols is the alkaline prewash used in refining cracked gasolines. Quite generally in such operations, an acid oil fraction is sprung from the alkaline wash solution, which fraction has a boiling range from about 350° to about 450° F., and a desirable cresol content. However, the economic value of the material is seriously reduced because it contains thiophenols in substantial amounts.

Accordingly, it is a fundamental object of the instant invention to provide a method which can serve as a basis for a process for separating phenols from thiophenols and serve to concentrate a mixture of the compounds into fractions relatively richer in phenol and thiophenol, respectively.

It is a second object of the invention to provide an adsorption process for the separation of phenols from thiophenols.

It is another object of the invention to provide a method of recovering a useful phenol fraction from acid oil.

I have discovered that relatively pure phenols can be separated from mixtures of phenols and thiophenols by contacting the mixtures with silica gel at ordinary temperatures. Mixtures of phenol and thiophenol which are rather closely related in structure by virtue of having substantially similar substituents on the respective benzene rings are readily separated, for the phenols are preferentially adsorbed on silica gel and can be extracted therefrom by using a suitable solvent from which they can be recovered. The process is applicable generally to mixtures of aromatic compounds of carbon, hydrogen, oxygen and sulfur, the one group of compounds containing oxygen and the other group in the mixture containing sulfur, wherein the oxygen and sulfur are attached directly to the nucleus.

In accordance with my invention, I prefer to filter the mixture of a phenol and thiophenol through a bed of silica gel until analysis of the effluent liquid or filtrate shows that phenol is no longer being adsorbed on the silica gel as indicated by the fact that the effluent has substantially the same composition as the charge. The silica gel bed is then washed with a suitable solvent, preferably a low-boiling hydrocarbon solvent, such as hexane, benzene or hydrocarbons boiling in the gasoline range, capable of removing unadsorbed material held in the filter bed, but incapable of extracting the adsorbed constituents from the silica gel. Following this washing, the adsorbed phenols are extracted from the silica gel by means of a suitable solvent, preferably a low-boiling ketone, such as acetone, butanone, or pentanone. Any hydrocarbon solvent boiling up to approximately 200° C. is suitable for the preliminary washing of the silica gel and any aliphatic ketone boiling up to approximately 200° C. is suitable for the extraction of the phenols from the silica gel.

To apply the process to a specific mixture of phenols and thiophenols, consideration should be given to the possibility that the phenol to be recovered may be substituted to such an extent that it will not be adsorbed preferentially. I have found that if the phenol to be recovered from admixture with a thiophenol is soluble in sodium hydroxide solution of a concentration about 10 per cent by weight, it will be preferentially adsorbed from admixture with very closely related thiophenols. The solubility of the phenol in any alkali metal hydroxide solution can be used, for example, sodium, potassium, lithium, rubidium, for it is the capacity of the phenol to form phenolate which is being tested, because it is those which form alkali phenolates which are readily adsorbed. In general, unsubstituted phenols will be adsorbed from admixture with unsubstituted thiophenols; likewise, substituted phenols will be adsorbed from admixture with substituted thiophenols. It is when a substituted phenol is to be recovered from admixture with unsubstituted thiophenol that the degree of substitution of the phenol or the degree of difference between the structures of the compounds should be considered. If the phenol is soluble in sodium hydroxide solution of about 10 per cent concentration, it will be preferentially adsorbed by silica gel.

As an example of the above procedure, the separation of thiophenol from 2,4,6-tertiary butyl phenol might be attempted. Because the hydroxyl group on the 2,4,6-tertiary butyl phenol is so hindered by alkyl groups, the thiophenol would be preferentially adsorbed. The 2,4,6-tertiary butyl phenol has no significant solubility in 10 per cent sodium hydroxide solution. However, 2,4-tertiary butyl phenol can be preferentially adsorbed from a mixture thereof with thiophenol and it is found to be readily soluble in 10 per cent sodium hydroxide solution.

Thus, the application of the process to the recovery of phenols from thiophenols as they occur in admixture, is well exemplified in the rendering of acid oils. These oils as they are sprung from spent caustic, may contain very low-boiling aliphatic acids, but will include phenolic and thiophenolic compounds of closely related structures in the fraction boiling from about 300° to 450° F. The phenolic bodies are easily recovered by successive adsorptive fractionations carried out with silica gel in accordance with the instant invention as illustrated by the following examples in which the separation of mixtures representing typical acid oil cuts is illustrated.

In order to demonstrate the invention, 125 grams of silica gel having a mesh size of approximately 8 to 14 was packed in a glass tube. The silica gel occupied a volume of 200 milliliters. Two hundred (200) grams of a mixture, containing 25 per cent by weight of meta-thiocresols and 75 per cent by weight of mixed meta- and para-cresols was percolated by gravity at room temperature through the bed of silica gel at the rate of 1.3 barrels per ton per hour. The filtrate was divided into seven separate equal cuts and each was analyzed for thiocresols. The data are given in the following table:

TABLE I

| Cut No. | Per Cent by Wgt. of Charge | Per Cent by Wgt. of Thiocresol | Per Cent by Wgt. of Cresols |
| --- | --- | --- | --- |
| 1 | 5.2 | 58.1 | 41.9 |
| 2 | 5.2 | 32.5 | 67.5 |
| 3 | 5.2 | 27.0 | 73.0 |
| 4 | 5.2 | 25.6 | 74.4 |
| 4 | 7.7 | 25.9 | 71.1 |
| 6 | 12.9 | 25.8 | 74.2 |
| 7 | 7.7 | 24.6 | 75.4 |

After 98.4 grams of the mixture had drained from the silica gel bed, hexane was admitted in order to remove all non-adsorbed material. The amount of hexane used in the washing step was approximately 200 milliliters. After the unadsorbed material was removed from the silica gel by hexane washing, the silica gel was washed with approximately 150 milliliters of acetone to remove the adsorbed material. The hexane and acetone were separated by fractional distillation from their respective extracts and these were analyzed for thiocresols. Data with respect to the extracts appear in Table II:

TABLE II

| Solvent | Per Cent by Wgt. of Solvent-Free Extract | Per Cent by Wgt. of Thiocresols | Per Cent by Wgt. of Cresols |
| --- | --- | --- | --- |
| Hexane | 31.5 | 24.6 | 75.4 |
| Acetone | 17.5 | 2.4 | 97.6 |

It is apparent from Table II that 17.5 per cent by weight of the original charge or 35 grams of cresols were recovered, containing 97.6 per cent by weight of cresols and 2.4 per cent by weight of thiocresols. Measured in terms of barrels of cresols per ton of silica gel, the yield was 1.6 barrels per ton. The cresols obtained were slightly better in quality than commercial cresols marketed by a well-known company. Commercial cresols, with which a sample prepared in accordance with my invention was compared, contained 2.6 per cent of thiocresols.

The cresols from the first extraction were again percolated through the silica gel and four cuts of filtrate were taken and analyzed for thiocresols. The data on these four cuts are given in Table III:

TABLE III

| Cut No. | Per Cent by Wgt. of Charge | Per Cent by Wgt. of Thiocresol | Per Cent by Wgt. of Cresol |
| --- | --- | --- | --- |
| 1 | 11 | 3.3 | 96.7 |
| 2 | 11 | 2.9 | 97.1 |
| 3 | 15 | 3.0 | 97.0 |
| 4 | 11 | 2.6 | 97.4 |

The silica gel was then washed with 200 milliliters of hexane to wash it free of unadsorbed material and thereafter washed with 150 milliliters of acetone to extract the adsorbed material. The data on the extracts obtained are given in Table IV:

TABLE IV

| Solvent | Per Cent by Wgt. of Solvent-Free Extract | Per Cent by Wgt. of Thiocresol | Per Cent by Wgt. of Cresol |
| --- | --- | --- | --- |
| Hexane | 41.0 | 2.3 | 97.7 |
| Acetone | 11.0 | 1.4 | 98.6 |

It will be seen from the table that 11 per cent of the initial charge of 35 grams containing 97.6 per cent of cresols and 2.4 per cent by weight of thiocresols was obtained as cresols having a purity of 98.6 per cent by weight.

It will be apparent that larger yields of cresols may be obtained by recontacting any or all of the filtrate cuts with silica gel. For example, the process can be carried out in series with the filtrate from one filter bed passing through successive filter beds followed by separate extraction of each bed with hydrocarbon solvent and ketone. In this manner it is possible to obtain a series of fractions of cresols of gradually decreasing purity from each bed and these fractions can be again treated in a series of contact steps with silica gel to increase the purity thereof. After contacting mixed phenols and thiophenols with silica gel, followed by extraction with hydrocarbon solvent and ketone, silica gel can be re-used for further treatment of phenol-thiophenol mixtures.

In additional testing of the process, a mixture of phenol and thiophenol containing 25 per cent by weight of thiophenol and 75 per cent by weight of phenol was subjected to the adsorption process. A column of silica gel containing 100 grams of 200 mesh activated silica gel was maintained at a temperature of about 110° F. in order to insure the retention of the percolating mixture in the liquid phase. One hundred (100) milliliters (approximately 105 grams) of the blend of phenol and thiophenol was added to the column and subjected to a pressure of 6 pounds per square inch gauge of nitrogen. Fractions of effluent were collected and their volume and weight recorded as follows:

TABLE V

| Fraction | Interval | Volume | Weight |
|---|---|---|---|
| | Min. | Cc. | Grams |
| Sample entered | 0 | | |
| 1 | .85 | 5.0 | 5.08 |
| 2 | .31 | 5.0 | 5.03 |
| 3 | .56 | 6.8 | 7.20 |

Fractions of the effluent from the column were taken after the intervals indicated and after the third fraction had been taken, nitrogen commenced issuing from the column. At this point, the test was ended, nitrogen pressure released, and heating discontinued. One hundred (100) milliliters of redistilled commercial hexane was introduced into the top of the column at 70° F. under a pressure of 15 pounds per square inch gauge of nitrogen and 105 milliliters of liquid collected from the column before nitrogen again began to issue therefrom. Following the same technique, 76 milliliters of acetone was passed into the column under a pressure of 6 pounds per square inch gauge of nitrogen and during a period of four hours 90 milliliters of effluent was collected. The hexane and acetone solutions thus recovered were separately distilled in the absence of air and the residues weighed. They were also analyzed for phenol and thiophenol with the following results:

TABLE VI

*Distribution of thiophenol and phenol*

[From acid-base titration using phenolphthalein indicator]

| Sample | Weight | Per cent of Charge | Per cent Thiophenol in Fraction | Per cent Phenol in Fraction |
|---|---|---|---|---|
| | Grams | | | |
| Original Charge | | | 22.6 | 77.4 |
| Fraction #1 | 5.08 | 4.8 | 88.4 | 11.6 |
| Fraction #2 | 5.03 | 4.8 | 40.8 | 59.2 |
| Fraction #3 | 7.20 | 6.9 | 23.0 | 77.0 |
| Residue from Hexane Wash | 56.2 | 53.5 | 24.8 | 75.2 |
| Residue from Acetone Wash | 19.0 | 18.1 | 1.2 | 98.8 |
| | [1] 92.51 | [1] 88.1 | | |

[1] Original charge was approximately 105 grams, so there was apparently a loss of some 12.5 grams (probably due to hold-up). Per cents are calculated on basis of 105 gram charge.

From these data, the figures showing the phenol content of the acetone extract, it was determined that about 24 per cent of the phenol present in the original mixture charged to the silica gel adsorption column was recovered in a state of about 99 per cent purity and that approximately 19 per cent of the thiophenol present in the mixture charged to the column was recovered with a purity of approximately 93 per cent.

Contact between the material undergoing treatment and the silica gel may be by contact filtration or percolation. Where percolation is used, upward or downward percolation may be practiced and the contact may be carried out at atmospheric pressure or at superatmospheric pressure.

The process as has been pointed out is particularly useful for the separation of phenols and thiophenols of closely related structure which would have substantially similar boiling points and reactivities and, therefore, complicate chemical processes for separation. By basing the process on the difference in adsorptivity of the compounds, as shown, it is possible to develop an appreciable concentration of the phenol in a given fraction by means of a single pass through an adsorption bed. As an empirical test of the type of phenol which can be separated from a thiophenol by means of the process, the solubility of the compounds in 10 per cent sodium hydroxide solution can be used. Where a phenol and a thiophenol have substantial solubility in sodium hydroxide solution and are rather closely related in structure, it is quite possible to base a separation on this adsorption process. For most reliable operation of the process, therefore, the degree of hindrance of the hydroxyl group in the phenol should be about the same as the degree of hindrance of the sulfhydryl group in the thiophenol. If the structures are very different, the one compound being relatively unsubstituted and the other carrying many hydrocarbon substituents, it is quite possible that the difference in adsorptivity between the compounds will be altered to the point that the polarities will change.

For example, a very highly substituted phenol, such as 2,4,6-tertiary butyl phenol, cannot be preferentially adsorbed from admixture with thiophenol by this process; it is the thiophenol which is adsorbed. If the thiophenol is highly substituted and the phenol is not, sharp adsorption of the phenol is aided.

In a similar manner, other mononuclear phenols, such as o-, m-, or p- mono n-butyl phenol are separable from corresponding mono n-butyl thiophenols. The compounds are of very similar structure, molecular weight and chemical reactivity, but the OH group of the phenol is free and the phenol can be adsorbed out of mixtures. Various propyl and isopropyl phenols are common and can be separated from corresponding thiophenols by adsorption in accordance with the process described. Xylenols constitute another type of phenol which is readily separated from admixture with thiophenols. Thus, the various xylenols, some of which occur in mixtures such as the acid oils mentioned, are readily separated from thiophenols or their corresponding thioxylenols, because the OH group of the xylenol is essentially unhindered and available for adsorption.

It will be seen, therefore, that I have found a simple method for separating phenols from thiophenols. Similar tests made with activated charcoal and activated alumina indicated that neither of these materials was effective to separate thiocresols from cresols.

What is claimed is:

1. The method of separating a mixture of phenols and thiophenols of similar structure into at least two fractions, the phenol being soluble in caustic alkali solution of about 10 per cent concentration, one of which is richer in phenols and the other of which is richer in thiophenols than the original mixture comprising, contacting the mixture with silica gel, removing the unadsorbed mixture from the silica gel and then solvent extracting a mixture richer in phenols from the silica gel.

2. Method in accordance with claim 1 in which the unadsorbed mixture is removed from the silica gel by washing it with a low-boiling hydrocarbon solvent and the fraction richer in phenols is extracted from the silica gel with a low-boiling ketone.

3. The method in accordance with claim 1 in which the fraction richer in phenols is extracted from the silica gel with acetone.

4. The method in accordance with claim 1 in which the fraction richer in phenols is extracted from the silica gel with butanone.

5. The method in accordance with claim 1 in which the mixture is an acid oil fraction boiling from about 300° to 450° F.

6. The method of separating a mixture of monohydroxy phenols and thiophenols of similar structure into at least two fractions, the phenol being soluble in caustic alkali of about 10 per cent concentration, one of which is richer in phenols and another of which is richer in thiophenols than the original mixture comprising, percolating a mixture of phenols and thiophenols through a bed of silica gel, removing unadsorbed mixture from said bed and then solvent extracting the adsorbed fraction richer in phenols from the silica gel.

7. The method in accordance with claim 6 in which the mixture is percolated through the bed until the effluent liquid is of substantially the same composition as the charge.

8. The method in accordance with claim 6 in which the unadsorbed mixture is removed from the silica gel by washing with a low-boiling hydrocarbon solvent and the adsorbed fraction richer in phenols is removed from the silica gel by extraction with a low-boiling ketone.

9. Method in accordance with claim 8 in which the ketone is acetone.

10. Method in accordance with claim 8 in which the ketone is butanone.

11. The method of separating monohydroxy mononuclear phenols from thiophenols of closely related structure comprising, percolating a mixture of phenols and thiophenols through a bed of silica gel until the effluent liquid has substantially the same composition as the charging mixture, washing the silica gel with hexane until substantially all unadsorbed mixture is removed and then extracting a fraction richer in phenols than the original mixture from the silica gel with acetone.

12. The method of recovering phenol from a mixture containing phenol and thiophenol comprising, contacting the mixture with silica gel, removing unadsorbed constituents from the silica gel, and then solvent extracting the adsorbed constituents from the silica gel.

13. The method of recovering concentrated cresols from a mixture containing cresols and thiocresols comprising, contacting the mixture with silica gel, removing unadsorbed constituents from the silica gel and then solvent extracting the adsorbed constituents from the silica gel.

14. The method in accordance with claim 13 in which the unadsorbed constituents are removed from the silica gel by washing with a low-boiling hydrocarbon solvent and the adsorbed constituents are removed from the silica gel by extraction with a low-boiling ketone.

15. The method in accordance with claim 13 in which the adsorbed constituents are extracted with acetone.

16. The method in accordance with claim 13 in which the adsorbed constituents are extracted with butanone.

17. The method of obtaining concentrated cresols from a mixture of cresols and thiocresols comprising, percolating said mixture through silica gel until the composition of the effluent is substantially the same as the charging mixture, washing the silica gel with hexane until substantially all hexane-extractable material is removed, then washing the silica gel with acetone and separating the acetone from the material extracted from the silica gel.

18. The method in accordance with claim 1 in which the mixture is contacted with silica gel at approximately atmospheric temperature.

19. The method in accordance with claim 11 in which the mixture is contacted with silica gel at approximately atmospheric temperature.

HANS SCHINDLER.

REFERENCES CITED

The following references are of record in the file of this patent:

UNITED STATES PATENTS

| Number | Name | Date |
| --- | --- | --- |
| 1,537,260 | Patrick | May 12, 1925 |
| 1,882,146 | Holmes | Oct. 11, 1932 |
| 2,098,779 | Gericke et al. | Nov. 9, 1937 |
| 2,343,165 | Adler | Feb. 29, 1944 |